US008053139B2

(12) United States Patent
Jiang et al.

(10) Patent No.: US 8,053,139 B2
(45) Date of Patent: Nov. 8, 2011

(54) SOFC THERMAL MANAGEMENT VIA DIRECT INJECTION

(75) Inventors: Yi Jiang, Horseheads, NY (US); Scott Christopher Pollard, Big Flats, NY (US); Dell Joseph St Julien, Watkins Glen, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1230 days.

(21) Appl. No.: 11/394,677

(22) Filed: Mar. 31, 2006

(65) Prior Publication Data

US 2007/0231650 A1      Oct. 4, 2007

(51) Int. Cl.
*H01M 8/04* (2006.01)
*H01M 8/10* (2006.01)

(52) U.S. Cl. .................. 429/513; 429/515; 429/495

(58) Field of Classification Search ................ 429/12, 429/30, 34, 35, 32, 38, 39, 512–515, 452, 429/456, 458–459, 545, 495
See application file for complete search history.

(56) References Cited

U.S. PATENT DOCUMENTS

| 5,273,837 A * | 12/1993 | Aitken et al. .......... 429/30 |
| 6,083,636 A | 7/2000 | Hsu ...................... 429/13 |
| 6,428,920 B1 * | 8/2002 | Badding et al. ....... 429/458 |
| 2003/0203272 A1 | 10/2003 | Kelly et al. ............ 429/38 |
| 2004/0131916 A1 * | 7/2004 | Hodge et al. ........... 429/35 |
| 2004/0202903 A1 * | 10/2004 | deVos et al. ........... 429/19 |

FOREIGN PATENT DOCUMENTS

| EP | 0668622 A1 | 2/1995 |
| WO | 03/010847 A2 | 2/2003 |
| WO | WO03/098728 A1 | 11/2003 |

OTHER PUBLICATIONS

"Distributed Feed Design for SOFCs with Internal Reforming"; Journal of the Electrochemical Society, 151 (11) A1891-A1898 (2004); Ayman M. Al-Qattan and Donald J Chmielewski.

* cited by examiner

*Primary Examiner* — Barbara Gilliam
*Assistant Examiner* — Claire L Roe
(74) *Attorney, Agent, or Firm* — Svetlana Z. Short

(57) ABSTRACT

The present invention provides structures and methods that utilize fuel reformation to assist in thermal management of a channel-less SOFC at the device cell and/or stack assembly level. At the device level, passive and/or active control of unreformed fuel, or a mixture of reformed and unreformed fuel, is used to inject fuel in a distributed manner along the anode chamber of the channel-less SOFC. The injected fuel can be controlled in its composition, pressure, velocities, and/or flow rates. Additionally, present invention provides thermal management across a plurality of fuel cells in a stack assembly by actively controlling fuel composition, pressure, velocities, and/or flow rates provided to fuel inlets of the fuel cells.

22 Claims, 12 Drawing Sheets

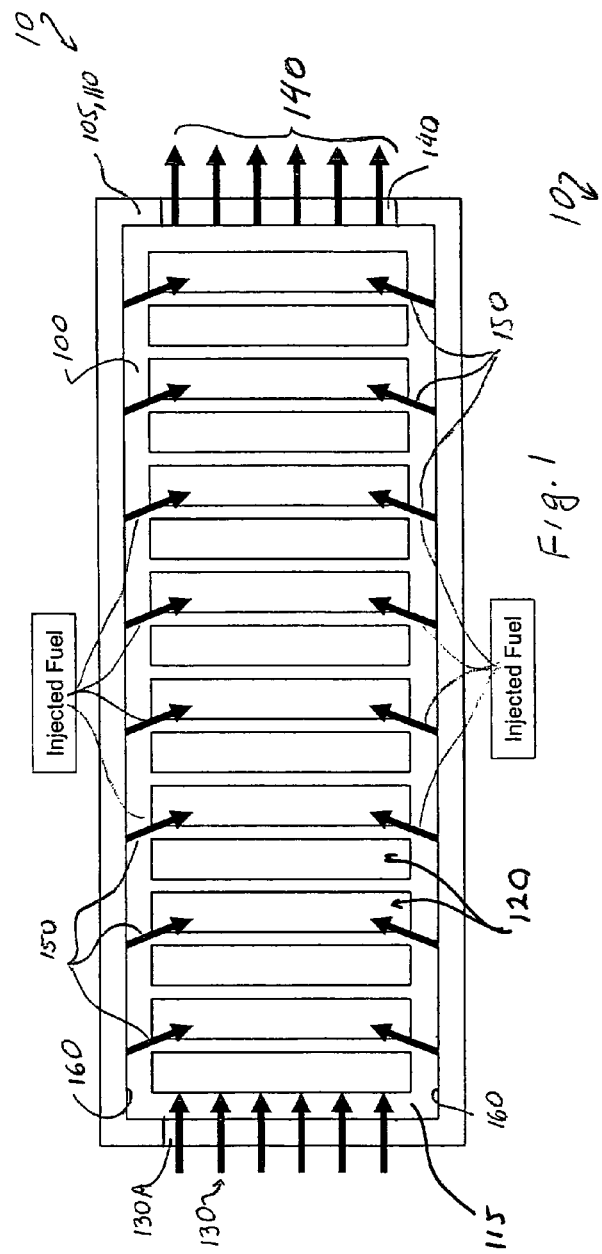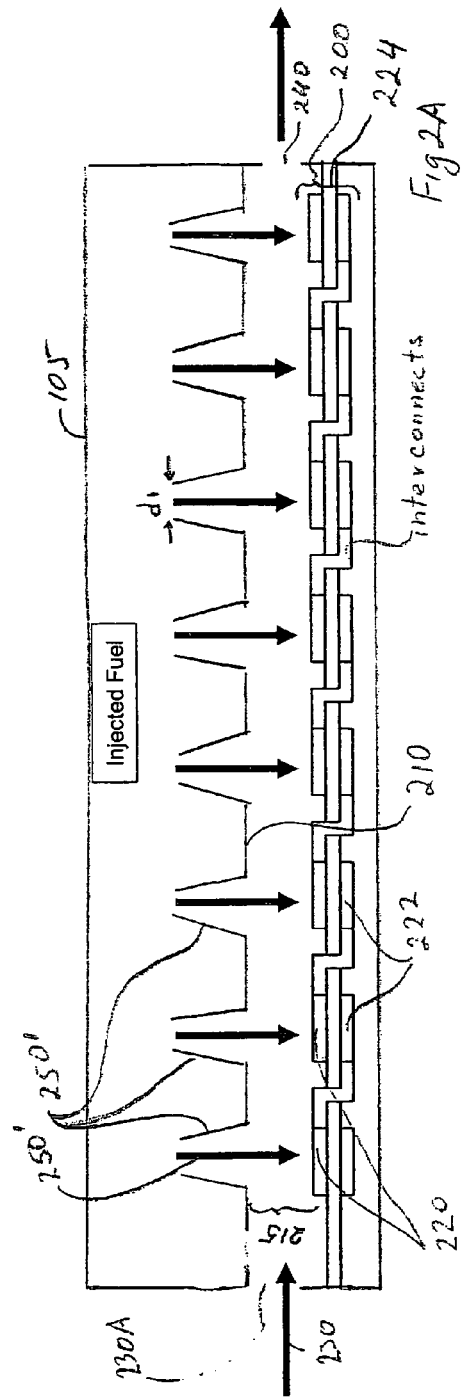

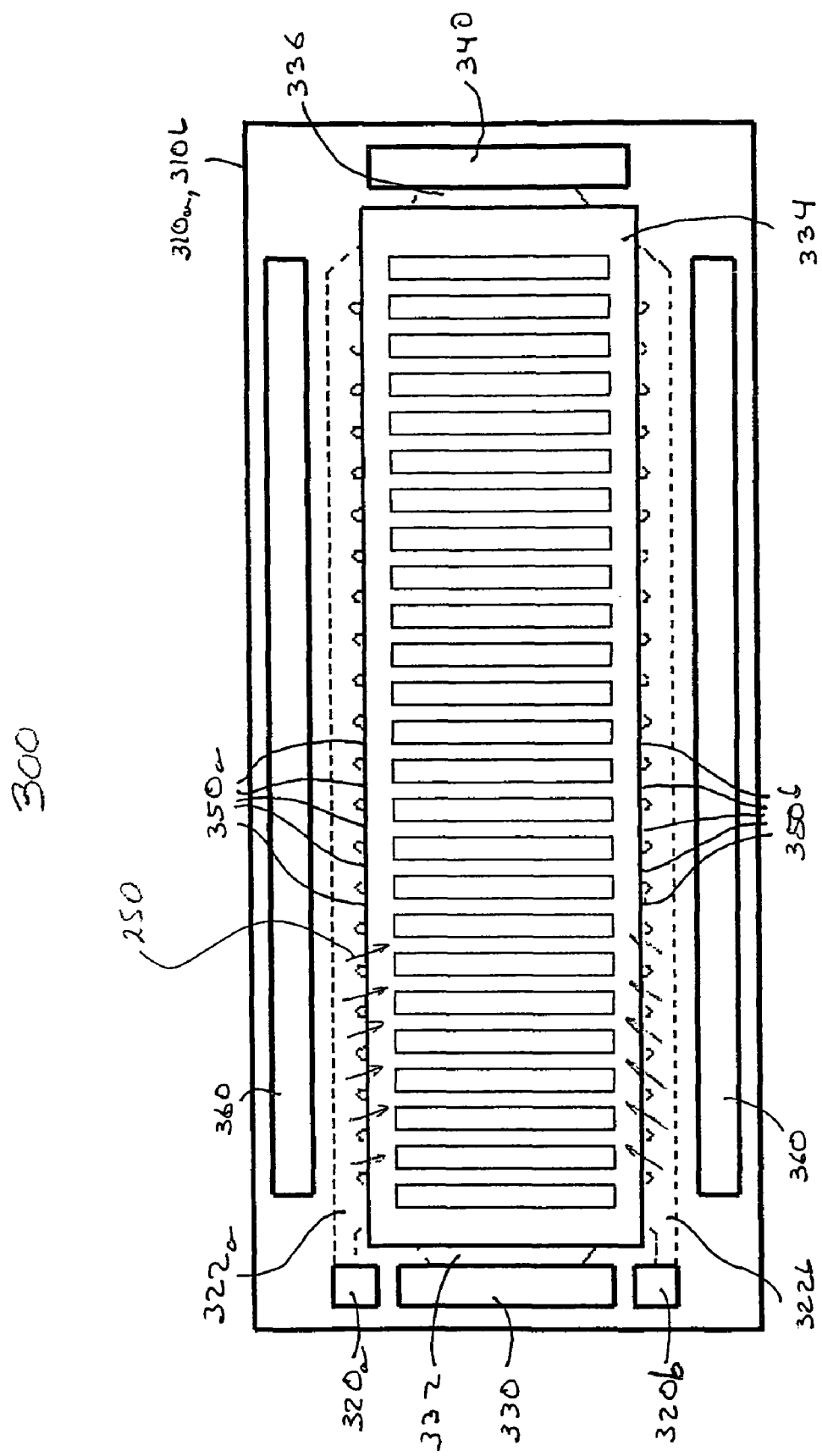

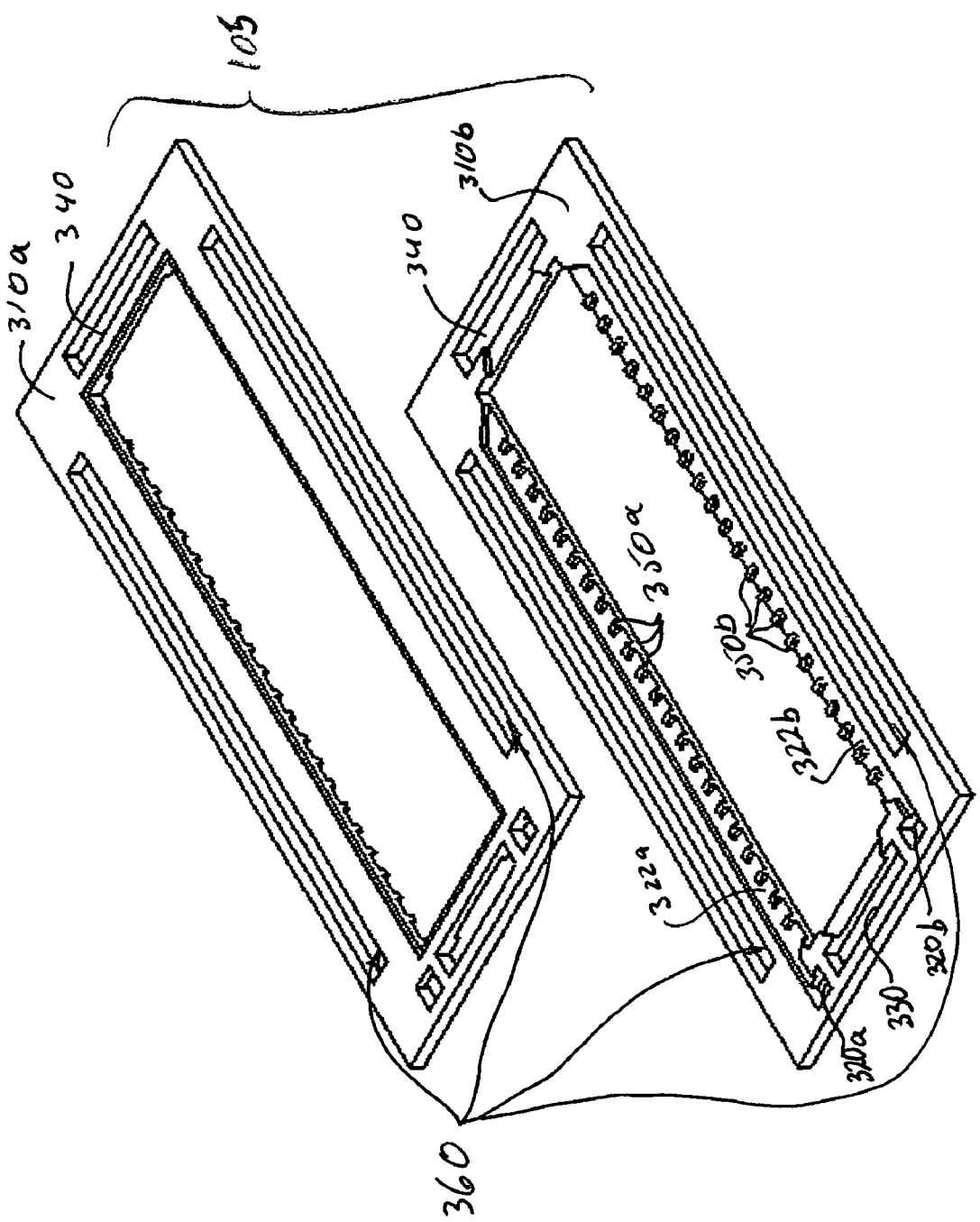

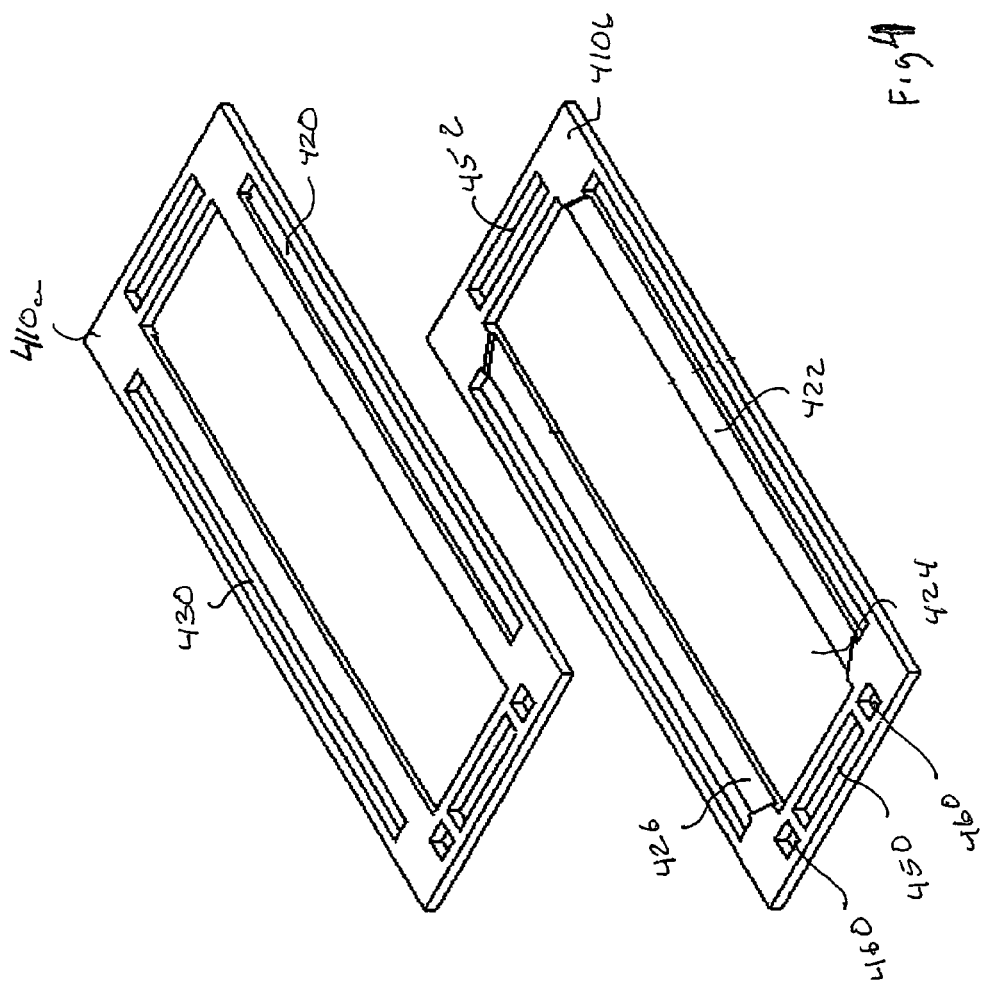

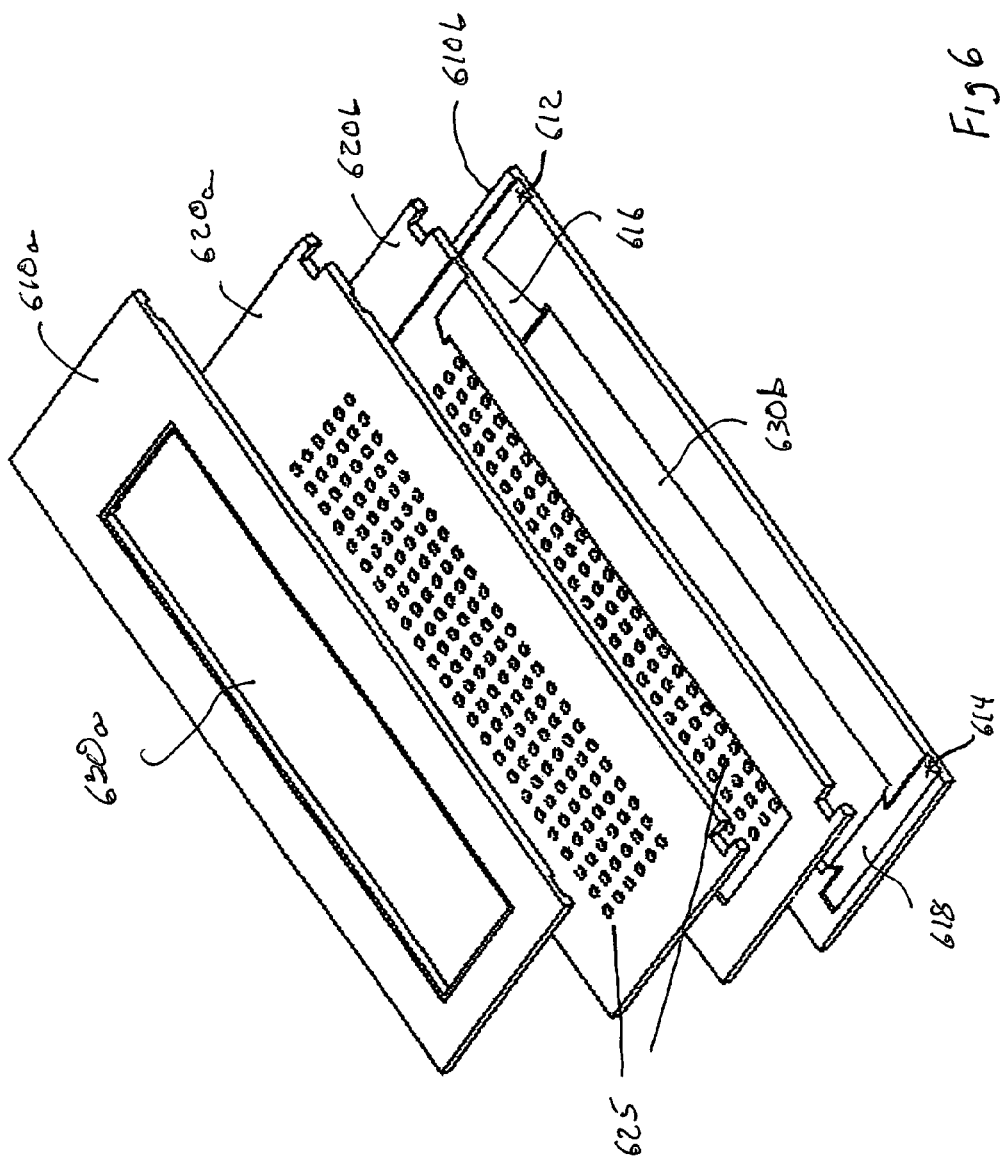

SOFC THERMAL MANAGEMENT VIA DIRECT INJECTION

BACKGROUND OF THE INVENTION

1. Field of the Invention

The present invention relates to structures for thermal management of planar solid oxide fuel cell systems, more particularly, those that enable internal reforming for thermal management at the device or cell level.

2. Description of the Related Art

The SOFC is widely considered the most desirable fuel cell for generating electricity from hydrocarbon fuels because it is highly efficient, and can at least partially internally reform hydrocarbon fuels. Solid Oxide Fuel Cells (SOFC) are reaching commercialization with several hundreds of residential stationary power units (about 1 kW) being tested in Europe and larger units (250 kW or above) being evaluated by various utility companies world wide. SOFC also are emerging as a possible power option for hybrid electrical vehicles and in auxiliary power units. Due to their high energy conversion efficiency (up to 40-60%), low toxic emissions, and flexibility in fuel choice (natural gas, diesel, gasoline, liquid petroleum, alcohol, coal gas, etc.), SOFC are being developed for the whole range of possible applications: stationary, transportation (or mobile), military, and portable.

Solid oxide fuel cells (SOFC) include a solid electrolyte medium separating the electrodes, typically a ceramic material such as yttria-stabilized zirconia (YSZ). The anode is usually a porous metal composite, such as Ni-cermet, and the cathode typically lanthanum-strontium manganese oxide (LSM). In SOFCs, hydrogen (or raw fuel) is converted to water at the anode while oxygen is converted into oxygen ions that migrate through the electrolyte ceramic to the anode. As the main current carriers are oxygen ions, which diffuse slowly at room temperature, operating temperatures ranging from about 800° C. to 1000° C. are typically used. These high temperatures require exotic and costly materials such as lanthanum chromite to be used for current collectors (interconnects).

FIG. 12 shows a conventional fuel cell assembly, which includes four basic elements: an anode, a cathode, an electrolyte, and an interconnect. The oxidant, usually air, is fed through a plurality of channels defined by the cathode and grooves in the interconnect to provide needed oxygen for the dominant reaction of hydrogen oxidation. In addition, the oxidant serves as a coolant when the fuel cell is hydrogen fed, and provides heat needed when the fuel cell assembly is methane fed (i.e. cells including endothermic internal methane reforming). In a manner complementary to the structure for providing oxidant to a cell, fuel is fed through a plurality of channels on the anode side of the cell, which are defined by the grooves formed in the interconnect and the anode. With such a structure, oxygen ions are conducted by the electrolyte and electrons are conducted by the interconnect during the process of hydrogen oxidation.

The electricity providing chemical reaction occurring at elevated temperatures in the SOFC is hydrogen oxidation ($H_2 + 0.5O_2 \rightarrow H_2O$), which is exothermic ($\Delta H = -241.8$ kJ/mol–H2) in nature, and thus heats the reaction sites. Left unchecked, the cumulative temperature within a cell/stack can quickly exceed maximum material design temperatures. In addition, the mass flow rates and partial pressures of the reactants as well as gas-phase temperatures vary along the direction of fuel flow causing temperature gradients. Large temperature gradients result in thermal stresses in the fuel cell, which can cause damage to the fuel cell's components. As such, temperatures must be managed to within a target range. Conventional methods of managing temperature include use of variable oxidant and fuel flow rates, heat exchangers within stack structures, and internal reforming.

Some level of heat transfer from the reaction sites to the fuel and oxidant gases occurs during normal operation of a SOFC. The amount of thermal energy in the gas is from a combination of gas-phase reactions as well as exchange (heat transfer) with solid-phase parts of the cell (anode, cathode, electrolyte, bipolar plates, etc.). With only the oxidation reaction predominant, and neglecting solid-gas heat transfer, the primary method of managing heat is through the heat capacity of the gas according to the general heat exchange relationship:

$$Q = q/C_p \rho \Delta T \qquad (1)$$

where Q=volumetric flow rate (m³/s), q=amount of heat transferred (kJ/s), $C_p$=specific heat of gas (kJ/kg–K), $\rho$=density of gas (kg/m³), and $\Delta T$=temperature differential between gas inlet and gas outlet (° K). From equation (1), it can be seen that the volumetric flow rate of the gas is inversely proportional to the change in temperature. Thus, a greater flow rate leads to a lower change in gas temperature. In this way, stack temperature can be controlled.

In some cases, however, it would not be practical or cost effective to use fuel and/or air flow rates alone to control temperature. Thus, alternative methods of heat exchange and/or recovery are needed. However the alternative methods of heat exchange and/or recovery add cost, size and complexity to SOFC design.

Another approach currently being considered involves introducing a portion of unreformed fuel such as methane into the fuel cell channels with some amount of water to perform steam methane reforming, which is highly endothermic. This method can reduce the system complexity (no need for external reformers) as well as manage temperature within and throughout the stack. Mathematical modeling of distributed feed profiles has been described in the literature. For instance, Ayman M., Al-Qattan, Donald J. Chmielewski, "Distributed Feed Design for SOFC's with Internal Reforming", Journal of The Electrochemical Society, 151 (11) A1891-A1898 (2004), describes using mathematical modeling and simulation to analyze chemical and thermal gradients, predict thermal-chemical performance, and propose distributed feed concentrations. While the Ayman et al. publication describes the concept of distributed feed to manage thermal-chemical gradients, it does not evolve the distributed feed designs/results into potential physical embodiments. Furthermore, it does not define SOFC stack level thermal management concepts as described herein with respect to the present invention. (A stack is constructed of a plurality, usually more than three, stacked SOFC devices.)

Another conventional method for thermal management of a fuel cell described in PCT Application No. WO 03098728 to Foger et al. involves processing a fuel supply stream of hydrogen, steam, at least one carbon oxide, and optionally methane, using a methanator to produce a fuel cell supply stream comprising a controlled concentration of methane, and reforming within the fuel cell methane present in the fuel cell supply stream. The methanator adjusts in response to fluctuations in the temperature of the fuel cell such that the concentration of methane in the fuel cell supply stream is controlled in order to achieve a desired level of reforming of methane within the fuel cell. While the Foger et al. method and design provides temperature control of the planar SOFC stack via internal reforming, thermal management is of the complete stack without regard to individual devices, cells, or active area.

Furthermore, temperature gradients in the cell/device can still exist along the fuel/oxidant flow direction and or along the direction of voltage build in the stack.

Thus, there remains a need in the art for more efficient, flexible and less complex structures and ways for managing fuel cell stack temperatures at the fuel cell or the fuel cell device level.

SUMMARY OF THE INVENTION

Accordingly, the present invention is directed to a method and apparatus that substantially obviates one or more of the shortcomings or problems due to the limitations and disadvantages of the related art.

Some embodiments of the present invention utilizes fuel reformation to assist in thermal management of an SOFC at either the fuel cell stack level, the fuel cell packet module level, or at the device cell level.

According to an embodiment of present invention a channel-less solid oxide fuel cell (SOFC) assembly, comprises: (i) at least one fuel cell device; and (ii) at least one frame module. The frame module comprises a fuel inlet for providing a fuel flow; a fuel outlet; and at least one internally manifolded passage with openings for distributed injection of fuel to the fuel cell device. The frame module supports a SOFC device and provides fuel to the channel-less SOFC assembly such that a single fuel chamber is situated adjacent to the SOFC device, and fuel provided by the at least one manifolded passage is exhausted through the fuel outlet.

In an aspect of the present invention, a channel-less solid oxide fuel cell (SOFC) assembly includes at least one solid oxide fuel cell device and at least one frame module. The frame module includes a primary fuel inlet providing primary fuel flow, a primary fuel outlet, and at least one internally manifolded passage with openings for distributed injection of fuel into the solid oxide fuel cell device. The frame module supports a solid oxide fuel cell device and provides fuel to the SOFC channel-less assembly, and fuel provided by the at least one manifolded passage mixes with fuel flow provided into the primary fuel inlet along the direction of the fuel flow.

In one embodiment of the invention, a method of thermal management in a channel-less SOFC includes the processes of providing flow of fuel along a main direction of an anode chamber of the channel-less SOFC and providing distributed injection of fuel from at least one side of the anode chamber.

According to another embodiment of the of the invention a method of thermal management in a channel-less SOFC stack includes the processes of reforming raw fuel, providing the reformed fuel to a plurality of controllable combiners, wherein each of the controllable combiners is connected to an inlet of a respective fuel cell chamber in the channel-less SOFC stack, controlling distribution of the raw fuel to each of the combiners, and providing a mixture of the raw and reformed fuel to the fuel cell chambers.

Additional aspects and advantages of the invention will be set forth in the description that follows, and in part will be apparent from the description, or may be learned from practice of the invention. The aspects and advantages of the invention will be realized and attained by the system and method particularly pointed out in the written description and claims hereof as well as the appended drawings.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate exemplary embodiments of the invention that together with the description serve to explain the principles of the invention. In the drawings:

FIG. 1 illustrates an embodiment of the present invention in which fuel is injected to an active area of an exemplary multi-cell cell device laterally (horizontally) along the flow path of the primary fuel.

FIGS. 2A and 2B show other embodiments of the present invention in which fuel is injected to an electrolyte supported multi-cell device active area vertically.

FIGS. 3A and 3B depict an exemplary laterally distributed injected fuel structure in accordance with a passive embodiment of the present invention.

FIG. 4 depicts an exemplary passive internal manifold air distribution structure in accordance with the present invention.

FIG. 6 depicts an exemplary passive external manifold fuel distribution structure with vertical distributed injection in accordance with the present invention.

DETAILED DESCRIPTION

Figure 2B:
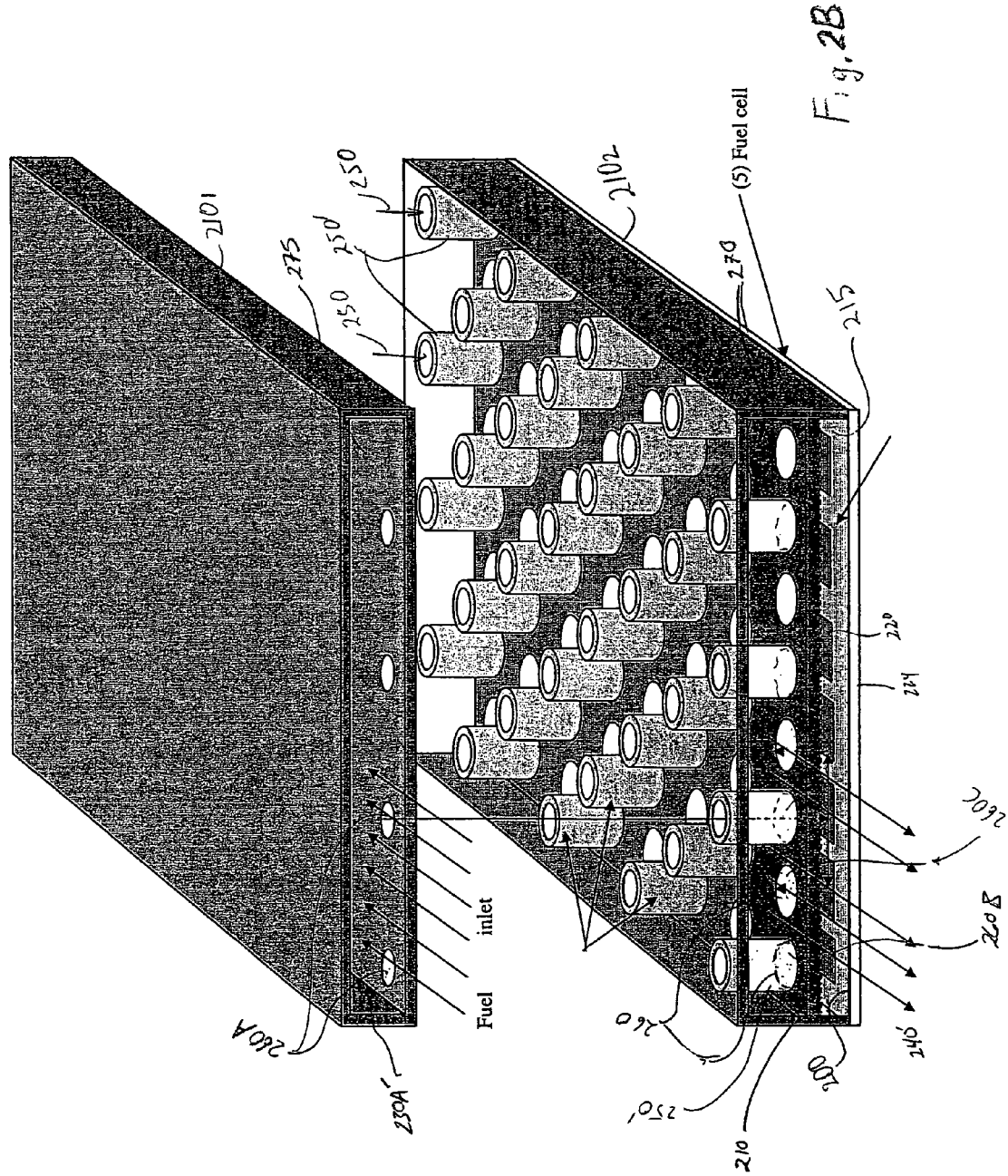

These and other aspects of the invention will now be described in greater detail in connection with examples that are illustrated in the accompanying drawings.

The structures and methods of the present invention manage temperatures of a fuel cell(s), a fuel cell device, and subsequent fuel cell stack temperature, and temperature gradients at the reaction site level, using injected endothermic fuel reforming reactions. Endothermic reforming reactions, such as methane reforming:

$$CH_4 + H_2O \rightarrow CO + 3H_2, \Delta H = 206.1 \text{ kJ/mol, and}$$

$$CH_4 + 2H_2O \rightarrow CO_2 + 4H_2, \Delta H = 165 \text{ kJ/mol,}$$

and $CO_2$ reforming:

$$CH_4 + CO_2 \rightarrow 2CO + 2H_2, \Delta H = 247.3 \text{ kJ/mol,}$$

facilitate lowering local temperature rises resulting from oxidation and other exothermic reactions (e.g., Water-Gas Shift, Boudouard, and $CO_2$ reduction).

The advantage of internal reforming (i.e., methane reforming at the cell level) for stationary SOFC systems is twofold: (1) external reforming equipment is either not required or drastically reduced, and (2) the stack heat rejection is reduced thus mitigating the need for secondary heat removal hardware such as heat exchangers.

Thermal management of Solid Oxide Fuel Cells (SOFC) may be obtained by using endothermic reforming reactions occurring locally at the cell and device level to control local temperature. One method of controlling and providing partially and/or unreformed fuel to the local sites is through distributed injection of fuel as described herein. The following embodiments of the present invention carry out distributed injection of fuel using passive and active designs. Passive designs are those in which structures to control distributed injection of gas are fabricated into the fuel distribution plates and cannot be changed to compensate for different operating and loading conditions. Active designs involve the ability to control gas distribution and quantity via valves and/or injectors in response to some condition, such as an operating and/or loading condition. While the examples described herein include either active or passive design, those skilled in the art will appreciate that the present invention may be practiced using a combination of both active and passive distributed injection.

It is noted that although a multi cell device (i.e., a device with multiple anode cathode pairs disposed on the electrolyte sheet) is shown in the following examples, the fuel cell device (s) may incorporate just one anode/cathode pair. In this case the anode and the cathode will be in a form of thin sheets, with an electrolyte sandwiched in-between.

With reference to FIG. 1, one embodiment of the channel-less fuel cell assembly 10 (e.g. channel-less SOFC assembly) of present invention is depicted with respect to laterally distributed fuel injection. FIG. 1 illustrates that fuel is injected into the channel-less fuel cell assembly and is provided to the active area of the multicell device 100 laterally (horizontally) along the flow path of primary fuel. Because the fuel chamber is not subdivided into multiple fuel channels, the fuel mixes better as it flows along the device. Because the fuel does not have to be injected into individual fuel chambers, the injection is simpler that that what is needed if each fuel channel was individually injected and because the fuel is mixed we achieve greater performance uniformity and enhanced thermal management. In FIG. 1, the anode side of a fuel cell device 100 is shown in plan view. A frame module 105 (including at least one fuel plate, frame or support 110) is provided between one fuel cell device 100 and another fuel cell device 100 (not shown), to thereby provide a single chamber 115 (preferably hermetic) in which the fuel passes. Two devices 100 spaced apart and supported by a frame or a fuel plate 110 may thus form a fuel cell packet module with an internal (fuel) chamber 115. Fuel is provided (from the left) to the chamber through the primary fuel inlet 130A along a primary fuel path 130, the fuel then passes over anodes 120 and exits at the exhaust 140. Additionally, fuel is injected laterally along paths 150 into the chamber 115 from locations along the inner side portions 160 of the fuel plate or frame 110. Because the two SOFC devices 100 with the frame module (or a fuel plate 110) situated therebetween form only a single fuel chamber, rather than a plurality of channels as in conventional SOFC devices, the term "channel-less" is coined and used herein to describe this aspect of the present invention. Similarly, a single SOFC device that forms, in combination with a frame module a single fuel chamber immediately adjacent to the fuel cell device (rather than a plurality of fuel channels) may be used to form a "channel-less" assembly. Although a fuel cell device assembly utilizing SOFC devices may have structures within the fuel chamber for providing better support or rigidity, according to the present invention, this assembly is "channel-less" because it does not have a plurality of fuel chambers—i.e., because the fuel provided into different portions of the fuel chamber freely mixes together. A fuel cell device, as the term is used herein, is a fuel cell device comprising a single electrolyte sheet situated between at least one cathode and at least one anode. A multicell device, as the term is used herein, is a fuel cell device with multiple cathodes and anodes forming multiple fuel cells.

FIG. 2A illustrates schematically a basic concept of a vertical distributed injection scheme for a channel-less SOFC assembly 10 in accordance with another embodiment of the present invention. In FIG. 2A, a fuel cell device (in this embodiment a multiple cell device 200) is shown in a side cross-sectional view. A fuel plate (also referred herein as frame or support), an embodiment which is described below in detail, is not shown for ease of explanation. In the exemplary embodiment of the fuel cell device 200, a plurality of anodes 220 are positioned along one side of a solid oxide electrolyte 224, and a plurality of cathodes 222 are positioned along the side of the solid oxide electrolyte 224 opposite the anode. A primary fuel supply 230 is provided from an inlet 230A into the fuel chamber 215 and exits at the primary fuel exhaust 240. FIG. 2A also shows distributed injection of fuel to the anodes 220 along a vertical direction 250, via structures 250'. While injected fuel is shown to flow perpendicular to a main device plane defined by the anode side of the (single) fuel chamber 215, it is to be understood that distributed injection may inject fuel into the primary fuel path at an angle from the perpendicular or at a plurality of angles from the perpendicular. The single fuel chamber design provides several advantages—it requires less structural material than what is required by the prior art devices, provides better mixing of the fuel, better temperature control and results in lighter stacks with more specific power density.

FIGS. 1 and 2A show a regular periodicity in the placement of fuel distribution injection sites. However, it may be desirable, in certain applications, to distribute injected fuel in another periodicity or in a non-periodic manner. Additionally, it is to be appreciated that each injected fuel distribution structure may be tailored to a particular pressure, velocity, and flow rate of fuel injected along the primary fuel path for individual or collective effect.

It can be further appreciated from the exemplary designs shown in FIGS. 2A, 2B that a primary fuel path need not be used or even present. A majority or even all of the fuel may be provided by distributed injection in the vertical direction with exhaust gasses exiting through the primary fuel outlet and the primary fuel inlet can become unnecessary.

Distributed injection of fuel may be extended to distributed collection of exhaust gasses to obtain an even greater level of temperature control to minimize both temperature gradients and fuel stream concentration gradients. Distributed collection of exhaust gases may be realized by insertion of a second (optional) partition 210 between the anodes 220 and vertical fuel gas injection structure 250'. This second partition 210 includes about twice as many holes 260B and 260C as the vertical gas injection structures 250' (e.g. tubes). Every gas injection structure 250' is associated with one hole 260B (in the second partition 210) and serves as a fuel port into the fuel chamber to a main device plane defined by the anode side of the (single) fuel chamber 215. The holes 260C not associated with the inlet openings from the fuel gas injection structures 250' in the second partition 210 provide ports for local extraction of exhaust gas from the fuel chamber 215. This partition 210 creates a space or chamber 270 for lateral flow of fuel exhaust gas to the fuel outlet 240'. Thus, in this arrangement, fuel injected vertically in a distributed manner flows through the gas injection structure 250' (e.g., tubes) toward the anodes, the fuel reacts to form exhaust gasses, and the exhaust gasses flow in a predominantly vertical direction toward a nearby exhaust port hole 260C in the second partition 210 and then out the fuel exhaust outlet 240'.

More specifically, the SOFC assembly of FIG. 2B includes a frame module that comprises two fuel plates $210_1$, $210_2$. The first fuel plate includes a fuel inlet 230A'. The fuel enters the fuel inlet 230A and passes through the second fuel plate $210_2$. The second fuel plate $210_2$ contains a plurality of gas injection structures 250' (e.g., tubes) forming a plurality of fuel passages The fuel is then provided via distributed injection, from the area provided inside the fuel plate $210_1$, by these fuel passages, to the fuel chamber 215. Thus, the area 275 (containing the fuel gas) inside the fuel plate 210, and plurality of passages (e.g. tubes) 230C form a manifolded passage for distributed fuel injection. The fuel is provided by the fuel gas injection structures 250, via fuel passages, to the fuel chamber 215. The plurality of fuel passages advantageously equalize or optimize the amount of fuel gas flow provided to different portions of the active area (i.e., the area over the electrodes) of the fuel cell device 200. The exhausted gas flows from the fuel chamber 215 through the openings 260C into the second fuel plate $210_2$ and is exhausted out of the frame module through the exhaust gas outlet 240'. The oxidant may be provided to the opposite side (cathode side) of the fuel cell device 100 in a similar manner to that of the fuel, by utilizing two (air) plates 210 which are structurally similar to the fuel plates $210_1$, $210_2$ described above.

The above-described concepts of lateral (horizontal) and vertical distributed fuel injection provide a number of ways in which the injected fuel can be distributed along various localized points of the chamber, and thus control the heat generated at these locations of the cell and the overall SOFC channel-less assembly. Each distributed injection method in accordance with the invention may be utilized in either an active or passive configuration, or combinations thereof.

For proper functioning of a SOFC, adequate fuel and oxidant streams must be supplied to the anode and cathode portions of a fuel cell, respectively. For the purposes of explanation, the following examples shown in FIGS. 3A-7 describe distributed injection fuel streams with inclusion of oxidant streams. To supply fuel to the anode chamber(s), a repeating fuel cell unit including fuel inlet, fuel exhaust, and fuel distribution could be utilized. In the context of the present invention, an additional fuel distribution/injection function is needed as well. This function may be provided by a manifolded passage with openings for distributed fuel injection to the fuel cell device. FIGS. 3A, 3B illustrate an exemplary preferred embodiment of such an anode fuel cell repeating unit containing each of these functions.

FIGS. 3A, 3B depict an example of a passive, laterally distributed/injected fuel structure 300 (e.g., a frame module) using machined plates 310a and 310b for ease of illustration. It is to be noted that all of the structures presented herein can be fabricated using some method to attach the plates together (e.g., welding, adhesive (for example a glass frit seal), etc.) and that the plates 310a, 310b can be fabricated using other materials and methods, such as ceramic or formed sheet metal. In the structure shown in FIG. 3, three gas paths are presented: primary fuel, distributed injected fuel, and air (or oxidant) pass-through. The incoming primary fuel (e.g. reformed fuel) is managed separately from the distributed injected fuel. The distributed/injected fuel is managed through a series of channels and structures engineering the pressure drops, velocities, and flow rates of fuel injected along the primary fuel flow path. In this passive design the number and periodicity of injection sites are pre-determined by design and fabricated into the plates. As such, the distributed/injected fuel profile is predetermined for a particular fuel cell operating point. Some control over the fuel flow rate may be achieved with control of backpressures. Oxidant (e.g., air) passages shown in FIGS. 3A, 3B are specific to this embodiment internal manifold design approach.

The exemplary embodiment illustrated in FIGS. 3A, 3B is made of two metal alloy plates bonded together into a frame module 300 with an appropriate joining technology (e.g., adhesive, welding, compression, etc.) and then coupled with two fuel cell devices thus making a preferably hermetic anode chamber. The fuel plates 310a and 310b of the frame module 300 are fabricated with fuel primary fuel passages containing a fuel inlet port 330, an inlet fuel distribution passage 332, a single fuel/anode chamber 334, a fuel exhaust passage 336, and a fuel exhaust port 340. In addition, two more lateral fuel passages (situated along the device) are fabricated into one or both plates for use as distributed injection (laterally along the fuel cell device) of partially reformed and/or unreformed fuel. The fuel passages include fuel inlet ports 320a, 320b, fuel distribution manifolds 322a, 322b, and fuel injection ports 350 providing fuel to the fuel chamber 334, a fuel chamber 215. Thus, in this embodiment, the frame modules provide a primary fuel inlet port 330, a primary fuel outlet port 340 (or exhaust outlet) and internally manifolded fuel passages 322a, 322b with a plurality of openings or distribution structures 350. In this embodiment, air pass-through channels 360 are fabricated into the fuel plates to provide passage of oxidant (e.g., air) to the next repeating unit (i.e., a cathode chamber). The two fuel plates 310a, 310b preferably support the fuel cell devices 100 such that their anode sides face one another, forming a fuel chamber therebetween, and the cathode sides of adjacent fuel cell devices also face one another.

It is noted that a configuration similar to that of FIG. 3, but without the primary fuel passage may also be utilized. In this embodiment, all fuel is provided via a plurality of injected fuel ports 350 (e.g., via passages 322a, 322b and injection ports 350).

Figure 5:
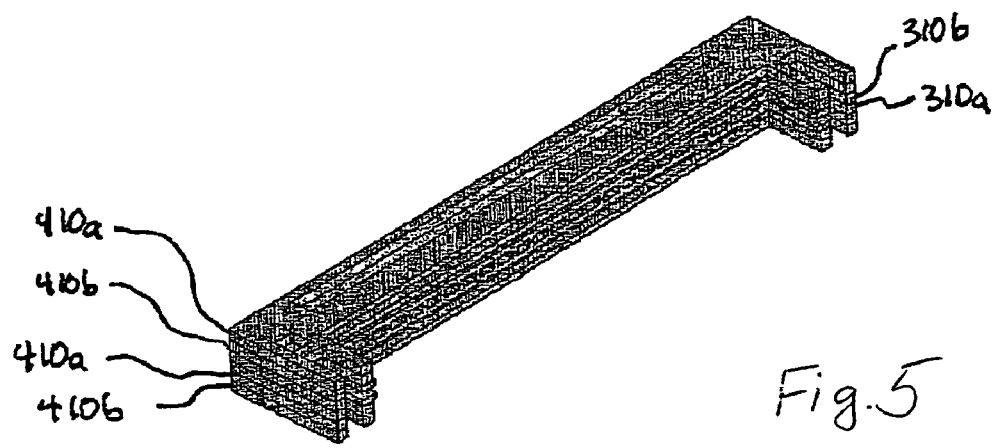
FIG. 5 is a cross-sectional view of a passive internal manifold laterally distributed injected fuel structure assembled with the structures of FIGS. 3 and 4.

The frame module may also include an internally manifolded air distribution structure. FIG. 4 illustrates an exemplary oxidant chamber embodiment in conjunction with the previous fuel chamber/plate design. The oxidant (e.g., air) plates 410a, 410b are fabricated and bonded together in the similar fashion as the fuel plates and also contain structures to distribute oxidant (e.g., air) to the cathode side of the fuel cell devices (cathode chamber). Each air plate 410a, 410b includes an air inlet port 420, an air inlet distribution passage 422, a single air/cathode chamber 424, an air exhaust passage 426, an air outlet 430. It is noted that passages 422, 426 need not to be present in both plates 410a, 410b. Also included in the plates 410a, 410b are primary fuel inlet pass-through channel 450, primary fuel exhaust pass-through passage 452, and two injected fuel inlet pass through channels 460. The fuel and oxidant plate assemblies are then combined to provide a repeating anode/cathode chamber unit. FIG. 5 is a cross-section of the assembled repeating unit—i.e., frame module that including fuel plates 310a, 310b and also includes oxidant plates 410a, 410b. This embodiment utilizes a cross-flow configuration was used for structure generation, but it is noted that this fuel distribution/injection structure is not exclusive of co/counter-flow configurations. A co-flow configuration is one in which fuel and oxidant flow in parallel and the same direction. A counter flow configuration is one in which fuel and oxidant flow in parallel but opposing directions. A cross-flow configuration is one in which fuel and oxidant flow in directions perpendicular, or substantially perpendicular (for example, 90±10°) to each other.

FIG. 6 shows an exemplary embodiment of passive distributed injection of fuel using the vertical distributed injection concept of FIG. 2A. This embodiment is fabricated with similar materials (e.g., machined plates) as in the above-described designs. In this structure, fuel distribution injection is made vertically with respect to the anode in the chamber and directly to the anode(s). As shown in FIG. 6, distributed injected fuel is routed between the two device window plates 610a and 610b, each including a primary fuel inlet port 612 and a primary fuel exhaust port (outlet) 614, an inlet fuel distribution passage 616, a fuel exhaust passage 618, and injected fuel distribution plates 620a, 620b including injected fuel distribution structures 625 provided to inject fuel perpendicular to the active area exposed in the device anode/fuel chambers 630a, 630b. The four plates 620a, 620b, 610a, 610b form a frame module 600 that supports two fuel cell devices with a fuel chamber therebetween. As shown in FIG. 6 the frame module includes a primary fuel inlet 612, a primary fuel outlet 614 and at least one manifolded passage with openings 625 for distributed injection of fuel into the fuel cell device(s). The injected fuel distribution structures 625 in this configuration can be a plurality of tapered or non-tapered holes passing to the anode chamber from the distributed injected fuel reservoir formed between the plates 620a, 620b. Holes also can be formed having diameters which change as a function of position along the length of the cell and/or device. However, the present invention is not limited to circular openings in the distribution plates 620. For example, non-circular openings, slits, or other shapes having different or the same size, along the cell and/or device can be used in the plates 620a, 620b. In addition, the openings in plates 620a, 620b may be arranged non-periodically. It may be preferable that the outlet openings are larger than the inlet openings, so as to provide the appropriate pressure drop across the fuel chamber and through the frame module. In the fuel plate structures of FIG. 6, no air passages are provided because this assembly is utilized in an open oxidant/air architecture (not shown) in which air/oxidant would be routed independent (i.e., on the outside) of the assembly of FIG. 6. Such architecture is utilized for example, in a fuel cell stack shown in FIG. 16B disclosed in U.S. patent application Ser. No. 11/392,293 entitled Solid Oxide Fuel Cell Assembly with Replaceable Stack and Packet Modules and filed on Mar. 28, 2006 in the names of Michael Badding and Dell St Julien. However, those skilled in the art will appreciate that alternative exemplary configurations of the present embodiment may include oxidant and/or fuel inlet and exhaust pass-through passages to distribute oxidant and fuel to other SOFC devices in the fuel cell stack.

Figure 7:
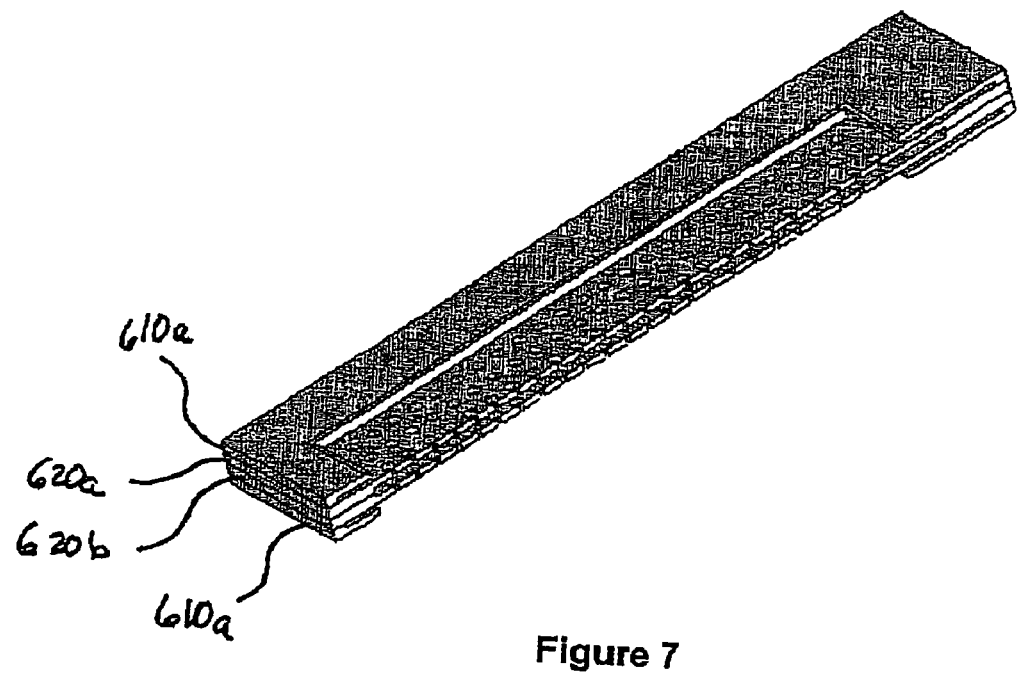
FIG. 7 is an assembled a cross-sectional view of the assembled structure of FIG. 6.

FIG. 7 is a cross-section of exemplary assembled frame modules utilizing an external manifold of the vertically distributed/injected assembly of FIG. 6.

Figure 8:
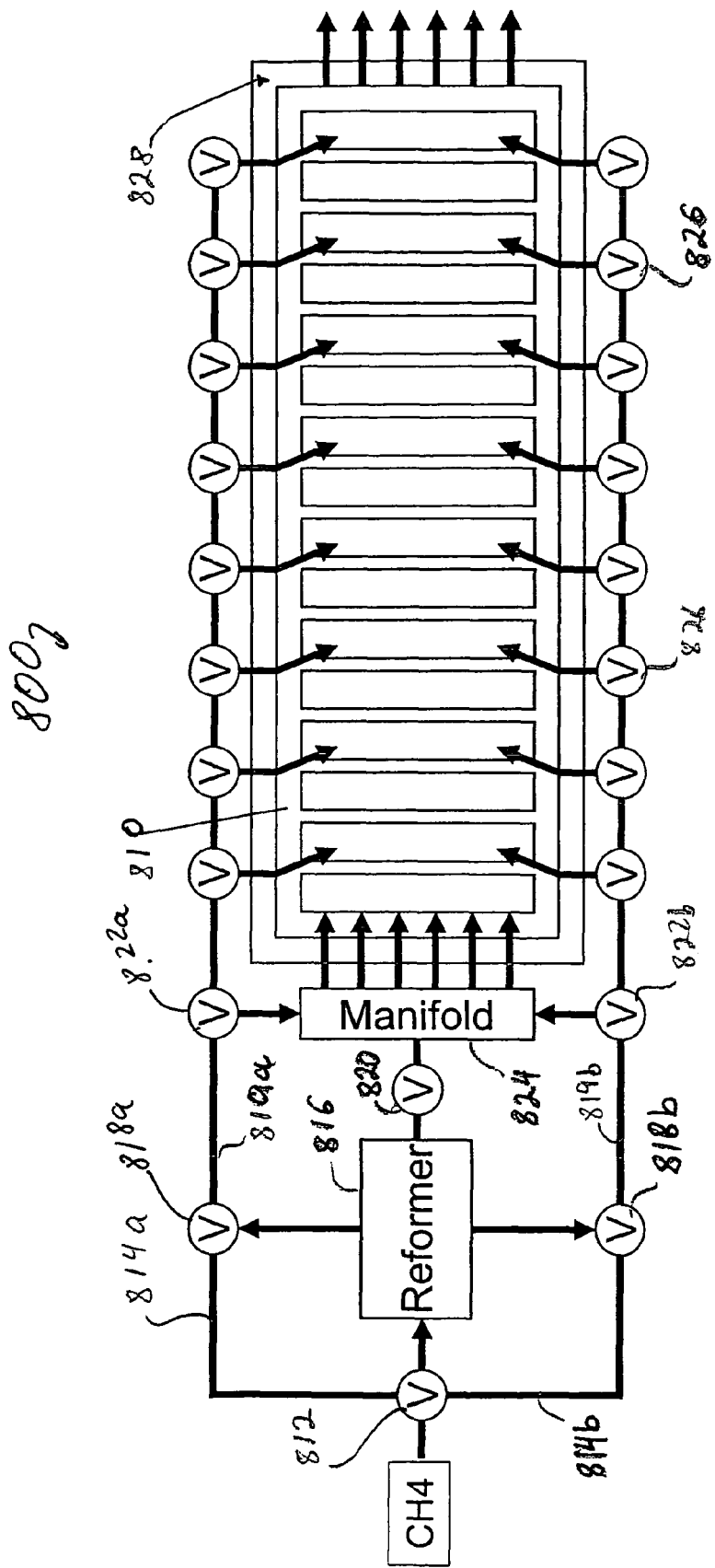
FIG. 8 illustrates an exemplary system for actively controlling primary and distributed injected fuel (to a fuel cell device) in accordance with the present invention.

FIG. 8 shows an exemplary frame module in accordance with the present invention that utilizes concepts of active control of distributed injection of fuel in a fuel cell or device. In FIG. 8, the solid oxide fuel cell assembly (system 800) includes a plurality of valves and/or injectors and/or mixers, generally labeled "V," hereinafter called "valves" for ease of explanation, which are arranged and actively controlled such that a combination of raw and reformed fuel (e.g., raw methane or reformed methane can be injected directly to the reaction sites along the cell and/or device 810. As shown in FIG. 8, raw methane gas enters the system at valve 812, which can divert some of the fuel along paths 814a and 814b. Fuel that is not diverted to paths 814a, 814b can be provided to a reformer 816. Reformed fuel from reformer 816 can be controlled by valves 818a, 818b, and/or 820. Valve 820 can control the amount of reformed fuel directly entering the manifold 824 from the reformer 816. Valves 818a, 818b can control the mixture of raw gas (such as raw methane) with reformed fuel and provide mixed or unmixed fuel along respective paths 819a, 819b. Valves 822a, 822b can control an amount of mixture of fuel in paths 819a, 819b with fuel in the manifold 824 and fuel to valves 826 for distributed injection along the anode side of the fuel cell chamber.

In the example shown in FIG. 8, the view of the device/cell 810 is shown along the centerline of the fuel chamber parallel to the device/cells 810, and injected fuel enters at an angle inclined towards the main fuel flow. It is to be appreciated that the injection of fuel may be facilitated by other designs in which the route of injection could happen perpendicular to the devices/cells as well in both axis (i.e., along the device/cell plane or perpendicular to the device/cell plane) or in some other direction.

FIG. 8 illustrates the basic elements of the active fuel distribution/injection according to one embodiment the present invention, which include manifolds, valves/injectors/mixers, reformer, and methane. The methane (or other raw fuel) can be reformed via the reformer 816 or bypassed such that the inlet and/or injectors (for example, structures 250', injection ports 350, or fuel distributors such as holes 625) can contain a mixture of reformed or unreformed fuel. The mixtures then enter the fuel chamber either through the main inlet and/or through the injectors 826. With such control of fuel mixture, pressure, velocity and flow rates of fuel injected into and along the primary fuel path, the present invention allows for adjusting such variables in response to varying load conditions, fuels, and/or operating conditions.

Figure 9:
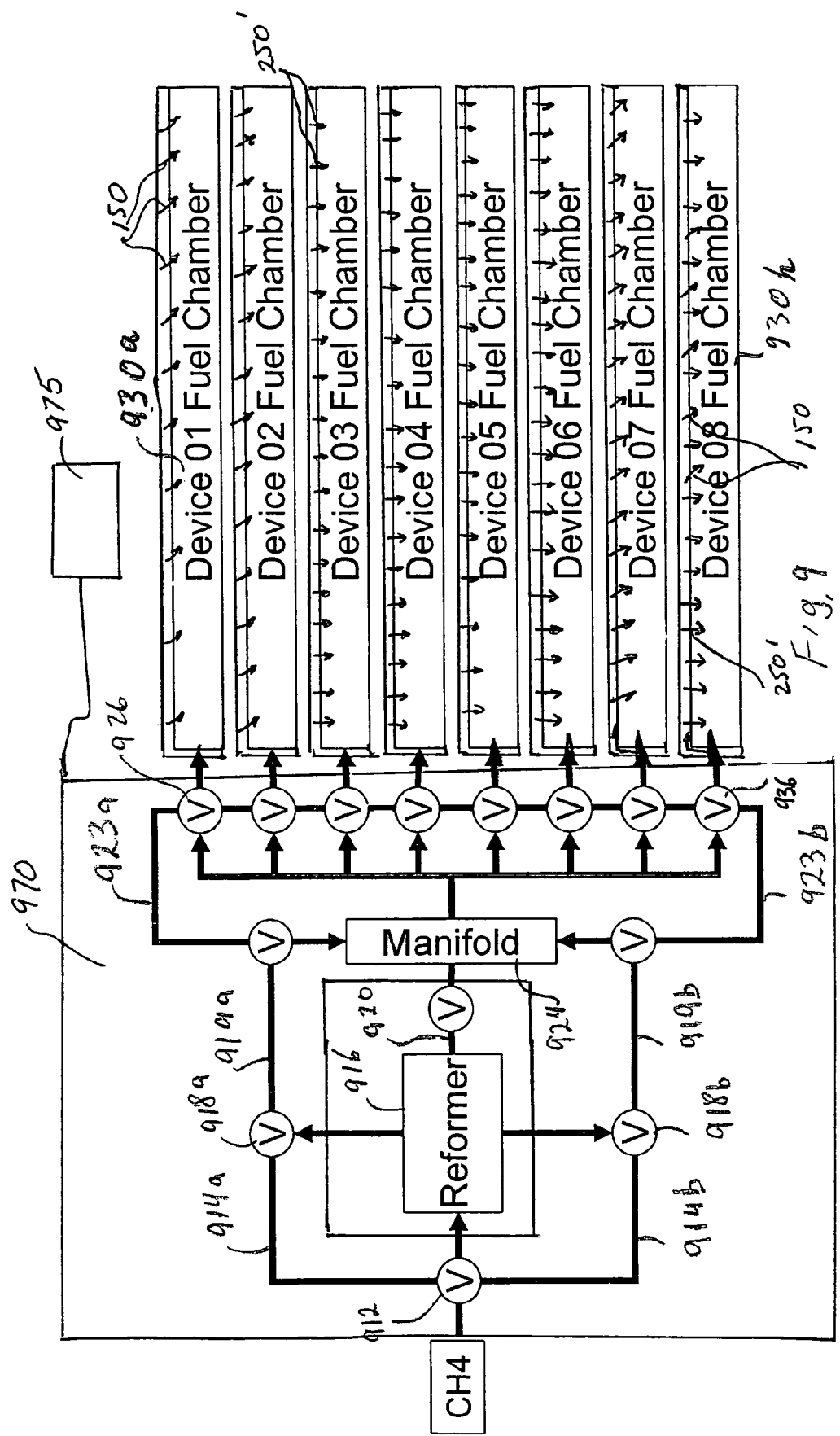
FIG. 9 illustrates an exemplary system for actively controlling fuel injection to a fuel cell device stack in accordance with the present invention.

Referring now to FIG. 9, the basic concept of active cell/device control of methane injection is applied in a system for controlling fuel at the inlets across a plurality of fuel chambers $930_a$ to $930_h$ formed by the frame modules (containing at least one fuel cell device) in a fuel cell stack. In this way, fuel at the inlet of certain devices/cells can be controlled for enhanced thermal management. FIG. 9 illustrates that raw methane gas (or other raw fuel gas) enters the system at a valve 912, which can divert some of the raw fuel along paths 914a and 914b. Fuel, which is not diverted to paths 914a, 914b can be provided to a reformer 916. Reformed fuel from reformer 916 can be controlled by valves 918a, 918b, and/or 920. Valve 920 can control the amount of reformed fuel entering the manifold 924 directly from the reformer 916, valves 918a, 918b can control the mixture of raw methane with reformed fuel and provide mixed or unmixed fuel along respective paths 919a, 919b, and valves 922a, 922b can control an amount of mixture of fuel in paths 923, 923b with fuel in the manifold 924 and fuel to valves 926 for distributed injection along the fuel cell device chambers $930_a$ to $930_h$.

Using FIG. 9 as a guide, an extension of the basic concepts of the present invention is demonstrated in connection with control of fuel/reformate composition for each fuel chamber in a stack. A practical system application may combine or selectively combine elements and schemes shown in FIGS. 8 and 9, for added control dimensionality. For example, such a system can control each fuel chamber in one dimension and methane injection at the reaction sites in the other dimension. Thus, according to some embodiments of the present invention a channel-less SOFC assembly includes at least one control device 970 (e.g., valve 926, injector 350 and/or mixer (not shown)) for controlling methane and reformed fuel flow from the reformer. The control device 970 is operatively connected to a controller 975 that dynamically provides the control device 970 with control inputs, according to the feed back data (such as powers generated, device efficiency, temperature, stack efficiency, etc.).

Figure 10:
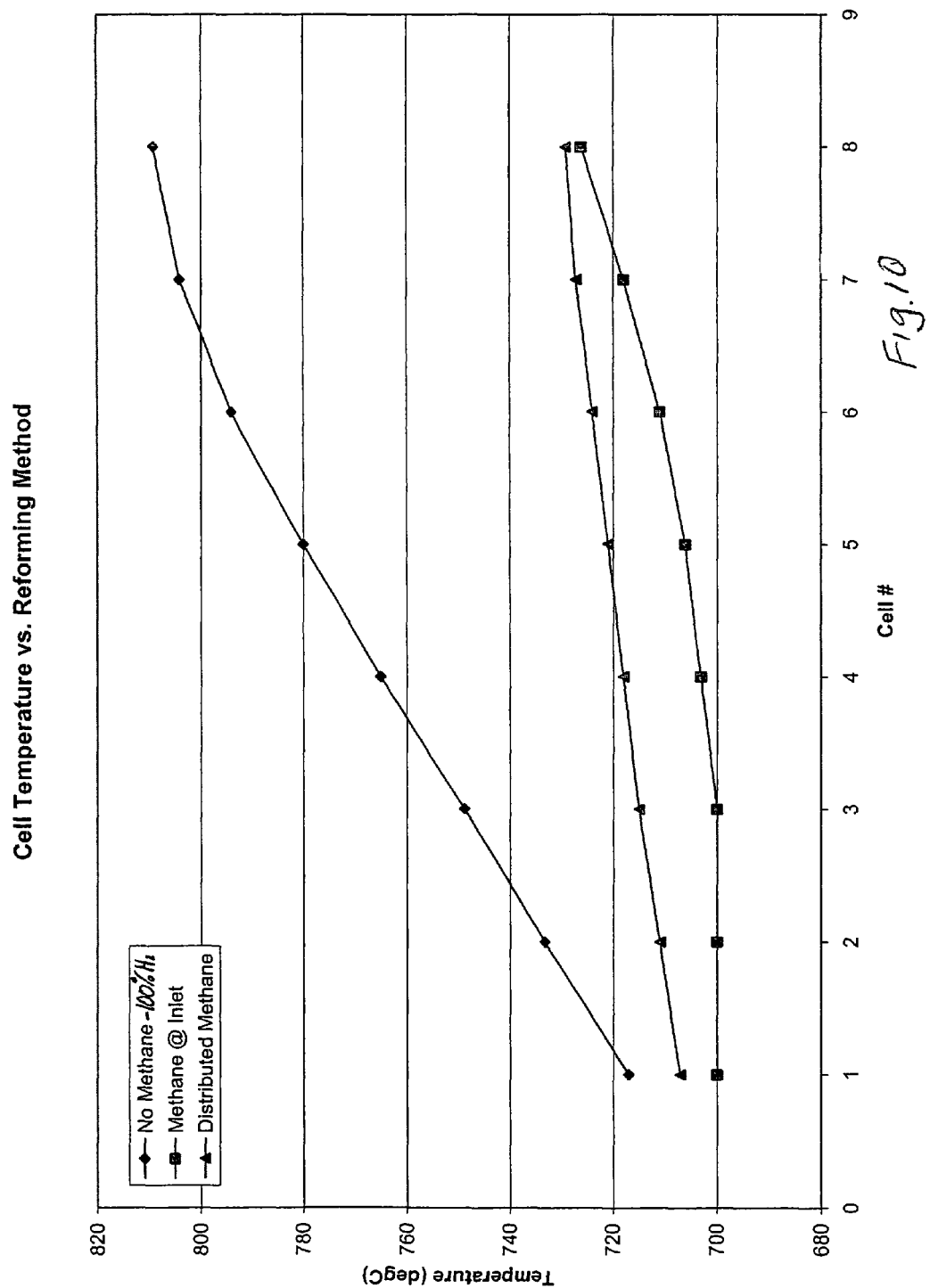
FIG. 10 is a graph of cell temperature of a fuel cell along a direction of fuel flow using three different fuel mixture scenarios.

FIG. 10 summarizes in graphical form modeling results demonstrating the thermal control concept across the SOFC device with 8 cells (similar to the device of FIG. 1) using cell temperature as an operating control point or characteristic. The graph shows cell temperature in a co-flow configuration using three different fuel mixture scenarios. The first scenario denoted "No Methane" is characterized by a continual inlet feed of 100% $H_2$ (along the primary path) as a baseline case. The temperature continues to increase along the direction of fuel flow due to the constant exothermic hydrogen oxidation reaction. The second scenario denoted "Methane @Inlet" is characterized by a hydrogen fuel with a small amount of methane introduced along the primary path. With the addition of methane and some level of internal reforming, the cell temperature stays closer to the inlet temperature of the fuel (i.e., 700° C.) until the exothermic reactions dominate. The third scenario denoted "Distributed Methane" is characterized by a constant distributed injection of raw methane along the fuel flow direction (injected along the sides of the frame module, or vertically as shown in FIG. 2). With distributed injection, greater control of the temperature is evidenced by a flatter temperature curve. Optimization of the distributed methane injection can be obtained, and with temperature and/or fuel concentration feedback, control algorithms can be implemented. It is important to note that in all cases the amount of hydrogen mass flow was the same for equal comparison.

Figure 11:
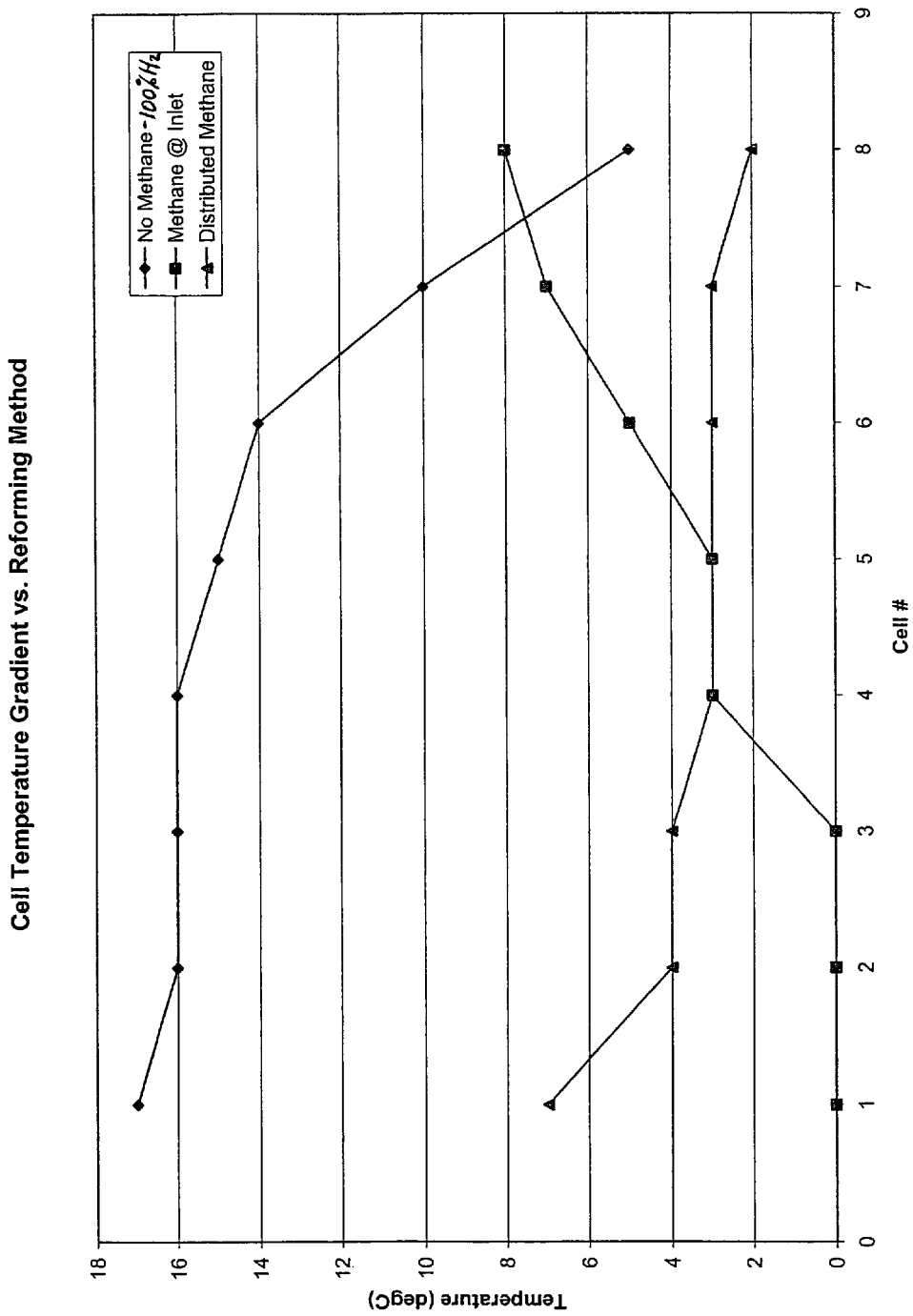
FIG. 11 is a graph showing temperature gradients along a fuel cell using three different fuel mixture scenarios.
Figure 12:
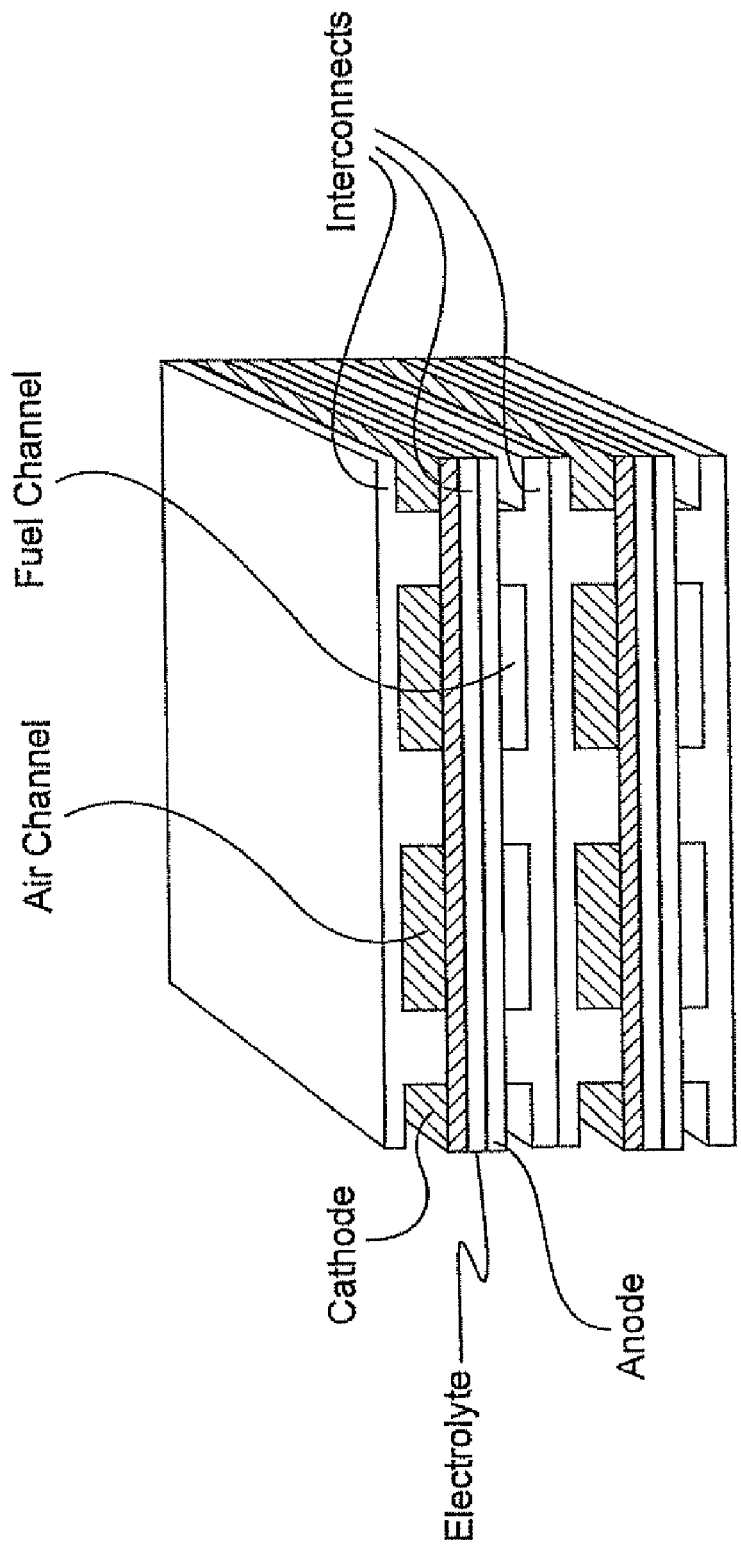
FIG. 12 depicts a conventional SOFC fuel stack including a plurality of fuel and oxidant channels.

FIG. 11 is a graph illustrating thermal gradients along the fuel cell device. A completely different (and almost opposite) gradient is imposed on the fuel cell device with the "Distributed Methane" scenario compared to the "Methane at Inlet" scenario, lending greater credence to the concept of thermal control via injected distributed methane. Thus, the channel-less fuel cell assembly may have a controllable thermal profile and may include at least one valve control device, such as a fuel valve, injector and or mixer. According to one embodiment the thermal control controls thermal profile of at least one fuel cell device. According to another embodiment, the thermal control controls thermal profile of the fuel cell stack (i.e., a plurality of assembled fuel cell devices). According to one embodiment of the present invention, a method of thermal management in a channel-less solid oxide fuel cell (SOFC) stack, comprises the steps of: (i) reforming raw fuel; (ii) providing said reformed fuel to a plurality of controllable combiners, each said controllable combiner connected to an inlet of a respective fuel cell chamber in the channel-less SOFC stack; (iii) controlling distribution of said raw fuel to each said combiner; and (iv) providing a mixture of said raw and reformed fuel to the fuel cell chambers.

While the foregoing description of the invention discusses methane as an exemplary raw and injected fuel, other exothermic reaction reactants can be used, such as $C_2+$ hydrocarbons and CO. Also, while not explicitly shown, various control schemes could be implemented optimizing for temperature and thermal gradients, fuel efficiency, coking, and operating efficiency and lifetime.

Direct or distributed injection of unreformed methane and/or reformats at the cell/device level as described in the present invention facilitates both fuel cell and device level thermal management. Additionally, the present invention provides stack level thermal management as well as finer granular thermal management within the cells of the stack to provide a number of dimensions of control. Reducing thermal gradients in active area along fuel flow direction reduces thermal stress in the device, and thus provides devices with longer lifetime and reliability.

Furthermore, the increased control of heat within the cell and also across a cell assembly provided by the present invention increases control of S/C ratio (reduced carbon deposition) and provides a platform for optimal fuel conversion efficiency.

The invention has been described with reference to particular embodiments of an SOFC device. However, it will be apparent to those skilled in the art that various changes and modifications can be made in the present invention without departing from the spirit and scope thereof. Thus, it is intended that the present invention cover the modifications of this invention provided they come within the scope of the appended claims and their equivalents.

What is claimed is:

1. A channel-less solid oxide fuel cell (SOFC) assembly, comprising:
    at least one solid oxide fuel cell device comprising (a) an electrolyte sheet; (b) a plurality of anodes situated on one side of the electrolyte sheet; (c) a plurality of cathodes situated on another side of the electrolyte sheet; said cathodes and anodes being electrically interconnected through said electrolyte sheet; and
    at least one frame module, said frame module comprising:
        a primary fuel inlet providing primary fuel flow in a first direction;
        a primary fuel outlet; and
        at least one internally manifolded passage with openings for distributed injection of fuel in a direction perpendicular to the first direction into the solid oxide fuel cell device,
    wherein said SOFC assembly includes no bipolar electrical interconnect plate situated adjacent to said at least one fuel cell device, and only a single fuel chamber is situated adjacent to the solid oxide fuel cell device; and said frame module supports the at least one solid oxide fuel cell device and provides fuel to the channel-less SOFC assembly, and fuel provided by said at least one manifolded passage mixes with fuel flow provided into the primary fuel inlet along the direction of said fuel flow, when both the fuel provided by said at least one manifolded passage and the fuel provided by the primary fuel inlet mix while flowing across at least one electrode of said solid oxide fuel cell device.

2. The channel-less solid oxide fuel cell (SOFC) assembly according to claim 1, wherein said frame module further comprising:
    at least one air feeder, comprising:
        an air inlet;
        an air exhaust outlet; and
        an internally manifolded air distribution structure.

3. The channel-less SOFC assembly according to claim 1, wherein a plurality of said passages provide distributed injection of fuel along the fuel cell device from only a single side of the fuel cell.

4. The channel-less SOFC assembly according to claim 1, wherein a plurality of said passages provide distributed injection of fuel along the fuel cell device from two sides of the fuel cell.

5. The channel-less SOFC assembly according to claim 1, wherein a plurality of said passages provide distributed injection of fuel along the fuel cell device to an anode side of the fuel cell device.

6. The channel-less SOFC assembly according to claim 3, wherein said passages have holes, and the diameter of said holes changes along the length of the cell device.

7. The channel-less SOFC assembly according to claim 4, wherein said passages have holes with a diameter, and the diameter of holes changes along the length of the cell device.

8. The channel-less SOFC assembly according to claim 5, wherein said passages have a diameter, and the diameter of holes changes along the length of the cell.

9. The channel-less SOFC assembly according to claim 1, wherein said distribution and injection of fuel into the cell device is passively controlled.

10. The channel-less SOFC assembly according to claim 9, wherein a plurality of said passages generate a continuously mixed fuel in said fuel chamber.

11. The channel-less SOFC assembly according to claim 9, wherein said cell device has said passage openings configured to manage a thermal profile.

12. The channel-less SOFC assembly according to claim 1, further comprising:
at least one control device for controlling methane and reformed fuel flow to and from a reformer.

13. The channel-less SOFC assembly according to claim 12, wherein said at least one control device is at least one of a valve, injector and mixer.

14. The channel-less SOFC assembly according to claim 1, further comprising:
at least one control device for controlling fuel flow to and from a manifold connecting a plurality of said fuel cells in a stack.

15. The channel-less SOFC assembly according to claim 14, wherein said at least one control device is at least one of a valve, injector and mixer.

16. The channel-less SOFC assembly according to claim 1, wherein the fuel cell device has a controllable thermal profile at least one control device for controlling the distribution and injection of fuel into the fuel cell device.

17. The channel-less SOFC device according to claim 16, wherein said at least one control device is at least one of a valve, injector and mixer.

18. The channel-less SOFC device according to claim 13, wherein control of said valves and/or nozzles controls a thermal profile of said fuel cell device.

19. The channel-less SOFC device according to claim 15, controlling said valves and/or nozzles controls a thermal profile of the stack.

20. The channel-less SOFC assembly according to claim 1, channel-less SOFC assembly includes at least one an electrolyte supported multi-cell device, with a plurality of anodes and a plurality of cathodes situated on a single electrolyte sheet.

21. The channel-less SOFC assembly according to claim 20, wherein said electrolyte supported multi-cell device includes an electrolyte sheet that is less than 45 μm thick.

22. A channel-less solid oxide fuel cell (SOFC) assembly, comprising:
at least one fuel cell device comprising (a) an electrolyte sheet; (b) a plurality of anodes situated on one side of the electrolyte sheet; (c) a plurality of cathodes situated on another side of the electrolyte sheet; said cathodes and anodes being electrically interconnected through said electrolyte sheet;
a frame module, said frame module comprising:
a fuel inlet for providing a fuel flow in a first direction;
a fuel outlet; and
at least one internally manifolded passage with openings for distributed injection of fuel in a direction perpendicular to the first direction into the fuel cell device,
wherein (i) said SOFC assembly includes no bipolar electrical interconnect plate situated adjacent to said at lest one fuel cell device and there is only a single fuel chamber is situated adjacent to the solid oxide fuel cell device; and (ii) said frame module supports a channel-less SOFC device to provide fuel to the single fuel chamber of said SOFC channel-less assembly, and fuel provided by said at least one manifolded passage is exhausted through said fuel outlet.

* * * * *